United States Patent [19]

Rosenberg

[11] 4,411,461
[45] Oct. 25, 1983

[54] BUMPER GUARDS

[76] Inventor: Harry Rosenberg, H. R. Packing Equipment and Supplies, 8941 Roosevelt Blvd., Philadelphia, Pa. 19152

[21] Appl. No.: 399,491

[22] Filed: Jul. 19, 1982

[51] Int. Cl.³ ............................................... B60R 9/10
[52] U.S. Cl. ..................................... 293/108; 211/17; 224/42.03 A; 224/42.03 B; 414/462
[58] Field of Search .......................... 211/17; 414/462; 224/42.03 B, 42.03 R, 42.03 A; 293/108

[56] References Cited

U.S. PATENT DOCUMENTS

| 2,816,377 | 12/1957 | Hastings | 224/42.03 R |
| 4,046,273 | 9/1977 | Hughes | 224/42.03 B |
| 4,109,951 | 8/1978 | Weller | 293/108 |
| 4,128,195 | 12/1978 | Collins | 222/42.03 B |
| 4,318,501 | 3/1982 | Graber | 224/42.03 B |

Primary Examiner—Richard A. Bertsch
Attorney, Agent, or Firm—Z. T. Wobensmith, III

[57] ABSTRACT

Bumper guards are disclosed for mounting on the bumper of an automotive vehicle with provisions for carrying a bicycle, skis and other articles, and with positive locking in elevated positions and providing better support for the articles.

7 Claims, 9 Drawing Figures

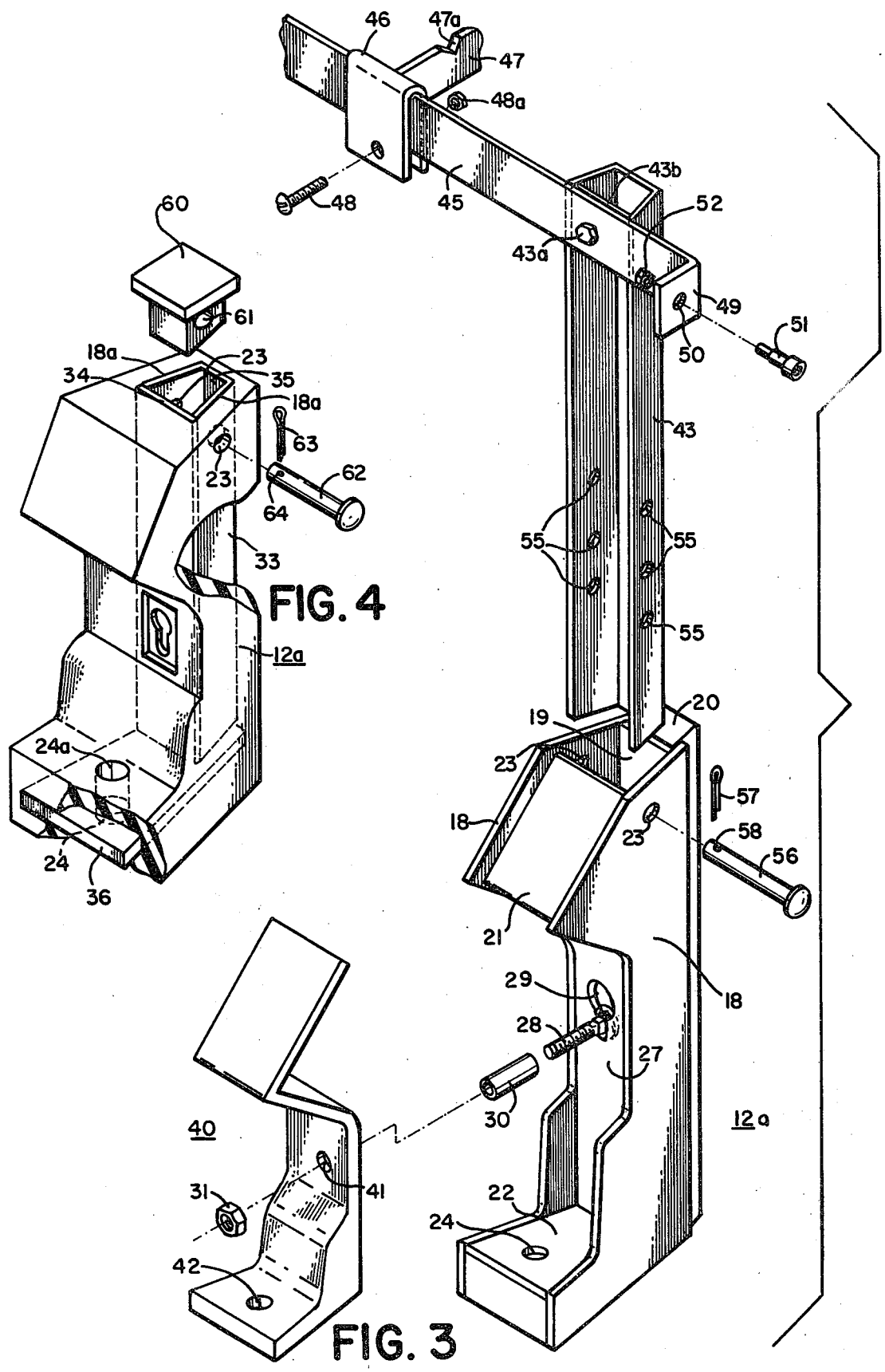

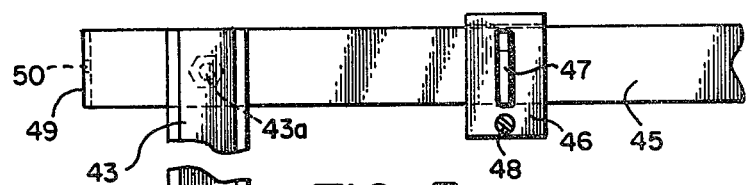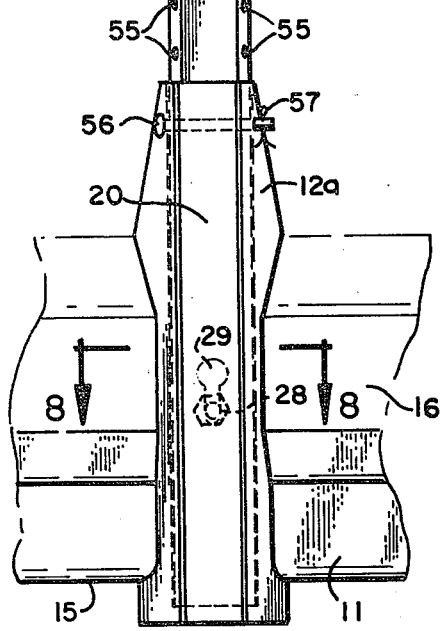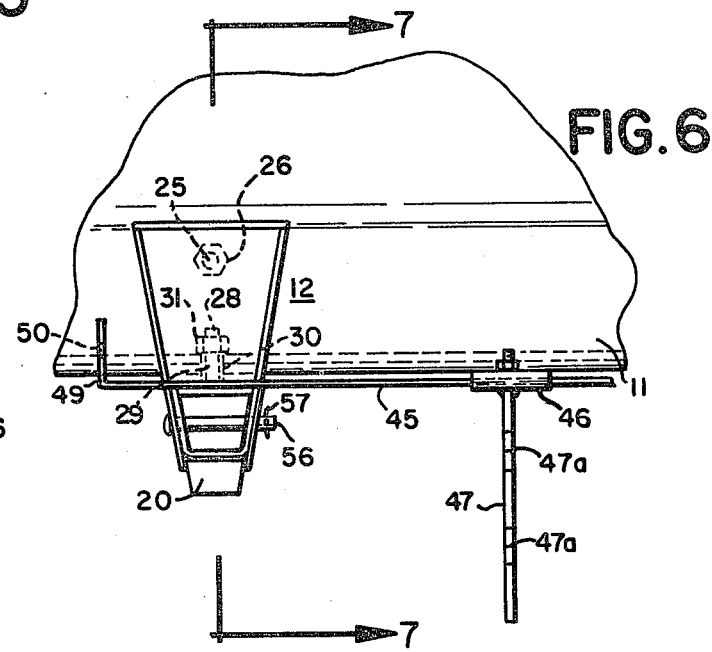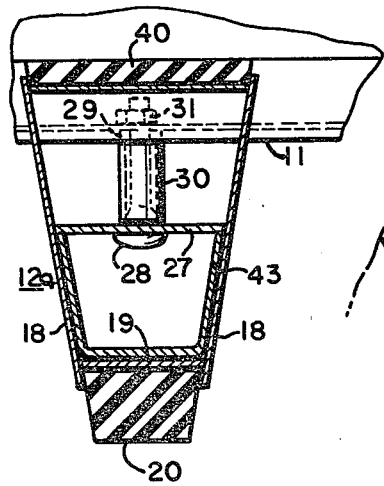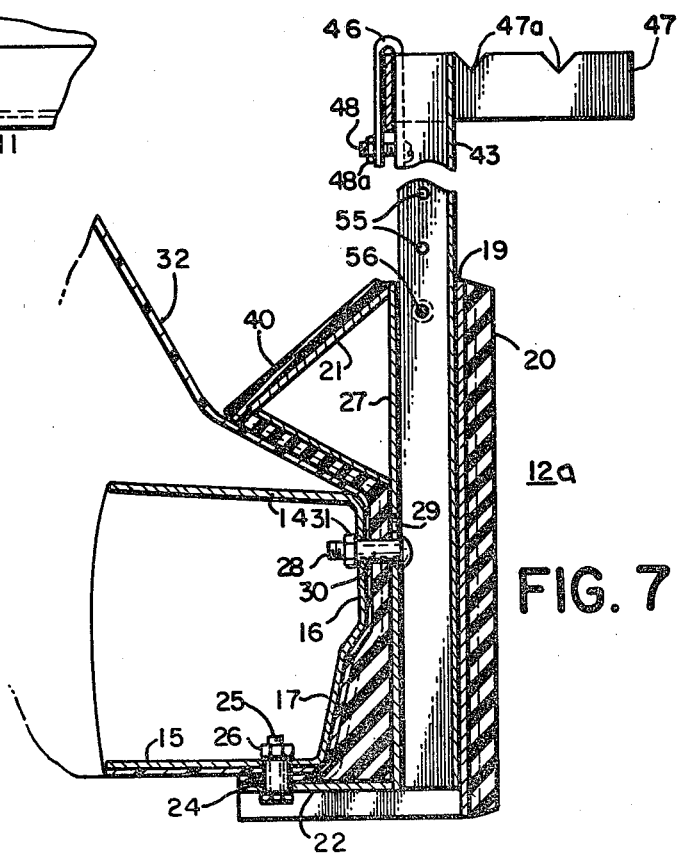

BUMPER GUARDS

BACKGROUND OF THE INVENTION

1. Field of the Invention

This invention relates to bumper guards for mounting on the bumper of an automotive vehicle with provisions for carrying a bicycle, skis and other articles.

2. Description of the Prior Art

Various bumper guards have heretofore been proposed.

The U.S. Patent to MESOW, No. 4,050,616, shows a bumper style bicycle carrying apparatus which includes a structure which can be formed as an integral part of the bumper, or as an attachment to a motor vehicle bumper, shown in extended condition in FIGS. 1, 3 and 6, and in collapsed condition in FIGS. 2 and 8. The bumper is shown at 22 with a horizontally depressed portion intermediate the top and bottom thereof. Bumperette housing members 30 are shown of U-shape which are clamped to the bumper by clamp assemblies 32 and held by anchor bolts 32a, and by anchor bolts 32b.

As shown in FIGS. 6 and 8, a vertical sleeve member 36 is provided with an internal cavity 34 and with a slot 36a (See FIG. 6) and ramp shaped cam surface 36b. The telescoping support member 38 is tubular for the reception of a rod 45 which supports a horizontal bar 50. A lock member 46 is provided to retain the rod 45 in extended condition.

A modified form of the invention is shown in FIGS. 9, 10 and 11, which includes internal threaded support members 74, 76 and 80, with a horizontal cross bar member 50' carried by the casing member 81.

The structure of MESOW differs in substantial respects from that of the present application, lacks the positive locking in extended position and provides a different character of support for the articles to be carried.

SUMMARY OF THE INVENTION

In accordance with the invention, bumper guards are provided for attachment to the bumper of an automotive vehicle with provisions for carrying a bicycle, skis, and other articles with positive locking in elevated position and providing better support for the articles.

It is the principal object of the invention to provide bumper guards for attachment to the bumper of an automotive vehicle which provide positive locking in elevated position.

It is a further object of the invention to provide bumper guards and a rail supported thereby for better support for the articles to be carried.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 3 is an exploded perspective view of a portion of the bumper guards and a rail as seen from the front and illustrates a guard made of steel plates;

FIG. 4 is a view of a modified form of a bumper guard made from synthetic plastic material, and with a top closure cap;

FIG. 5 is a rear elevational view of one of the bumper guards and its cross bar;

FIG. 6 is a top plan view;

FIG. 7 is a vertical sectional view taken on the line 7—7 of FIG. 6;

FIG. 8 is a horizontal sectional view taken on the line 8—8 of FIG. 5; and

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

Figure 1:
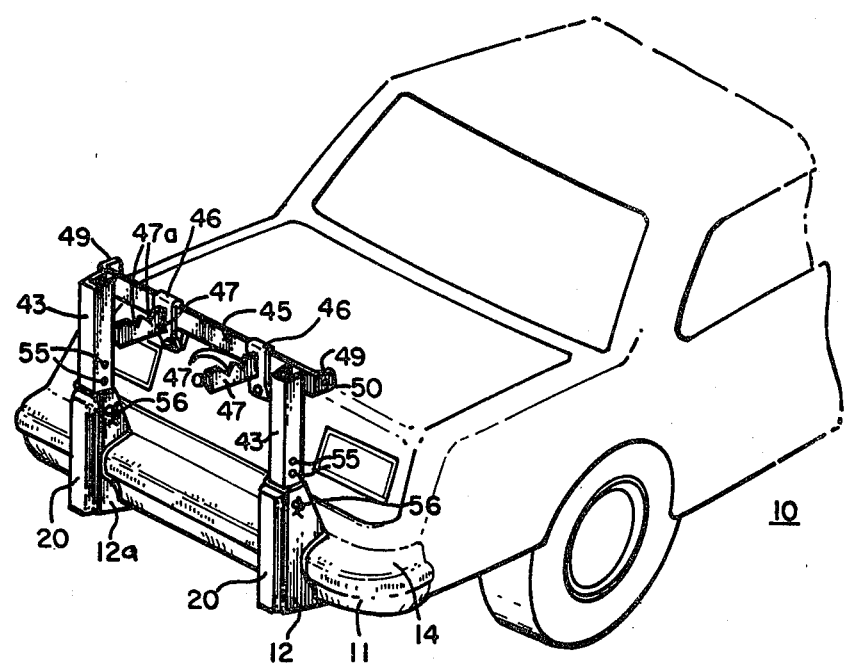
FIG. 1 is a view in perspective of the bumper guards having provisions for carrying a bicycle.
Figure 2:
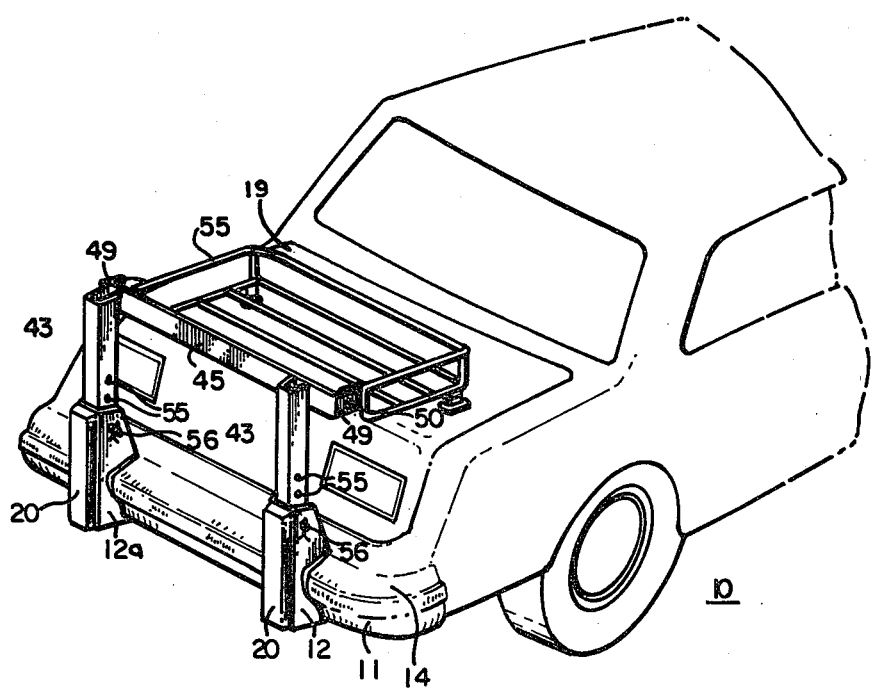
FIG. 2 is a view in perspective of the bumper guards having provisions for carrying other articles.

Referring now more particularly to FIGS. 1 and 2 of the drawings, one embodiment of bumper guard is shown on an automotive vehicle which is shown generally at 10, having a bumper 11 with bumper guards 12 and 12a spaced apart on the bumper 11. While the bumper 11 is shown as a rear bumper, the invention is equally applicable to a front bumper.

Referring now more particularly to FIGS. 3 and 7, one preferred embodiment of my invention is there illustrated. As shown in FIG. 7, the bumper 11 has upper and lower horizontal portions 14 and 15 with a vertical front portion 16 extending downwardly from the horizontal portion 14 and with an inclined portion 17 connected to the lower horizontal portion 15.

In FIG. 3, the bumper guard 12a there shown is made of metal plates preferably welded together and includes side plates 18, slightly divergent, a front plate 19 to which the side plates 18 are connected, a rubber insert 20, an upper connecting plate 21 to which the side plates 18 are connected, a lower connecting plate 22 connected to the back plate 19 and to the side plates 18. Aligned holes 23 are provided for purposes to be explained. The lower connecting plate 22 has a hole 24 therein.

As shown in FIG. 7, the bumper guard 12a is secured to the bumper 11 by a bolt 25 and nut 26, the bolt extending through the opening 24. The vertical portion 27 of the bumper guard 12a is secured to the vertical portion 16 of the bumper 11 by a bolt 28 which extends through a keyhole shaped slot 29 in the front plate 19, through a spacer 30 and is secured by a nut 31.

A resilient cover 32 is normally inserted between the bumper guards 12 and 12a and the bumper 11 and extends to cover the gap between the bumper 11 and the car 10.

The spacer 30 is useful for spacing the bumper guard 12 or 12a from the bumper 11 and helps to prevent disfigurement of the cover 32.

The bumper guards 12 and 12a each has a cushioning plate 40 between them and cover 32 which plate has an opening 41 for reception of the bolt 28 and spacer 30. The plate 40 also has an opening 42 for the reception of the bolt 25. The plate 40 can be formed of any suitable material such as synthetic rubber.

Referring now to FIG. 4, the bumper guard 12 there shown is molded of any suitable synthetic plastic and includes an inner tubular metallic portion 33 with flared side walls 18a extending from a wall 34 and with a connecting wall 35, the walls 18a having aligned openings 23. The portion 33 has a metallic plate 36 secured thereto with an opening 24 and an upper opening 24a aligned therewith.

As shown in FIGS. 3, 5 and 7, vertically slidable members 43 are provided of similar shape to that of the interior of the vertical portion 27, and at the upper end of the slidable members 43 a bar 45 is secured thereto by a bolt 43a connected to a fixed plate 43b which has slidably carried thereon, for horizontal adjustment, clamps 46 with forwardly extending arms 47 with notches 47a carrying a bicycle (not shown) between the bar 45 and the vehicle 10. Tightening screws 48 with nuts 48a are provided for retaining the clamps 46 at the desired positions of adjustment. The bar 45 has forwardly extending lugs 49 with openings 50 through which bolts 51 extend with nuts 52 thereon. The slidable members 43 have a plurality of vertically spaced horizontal aligned openings 55 for the insertion of a pin 56 held by a cotter pin 57 inserted in an opening 58 in the pin 56, the pin 56 being inserted at the desired position of vertical adjustment of the bar 45.

As shown in FIG. 4, a cap 60 having horizontally aligned openings 61 can be provided for insertion in the top of the bumper guards 12 and 12a when the slidable members 43 are not used. The cap 60 can be held in place on the bumper guards 12 and 12a by a pin 62 extending through the openings 23 and 61, and cotter pin 63 is insertable in an opening 64 in the pin 62.

Referring now to FIG. 2, a modified form of the invention is there illustrated in which a rack 55 is provided supported on the rear portion of the vehicle 19.

Figure 9:
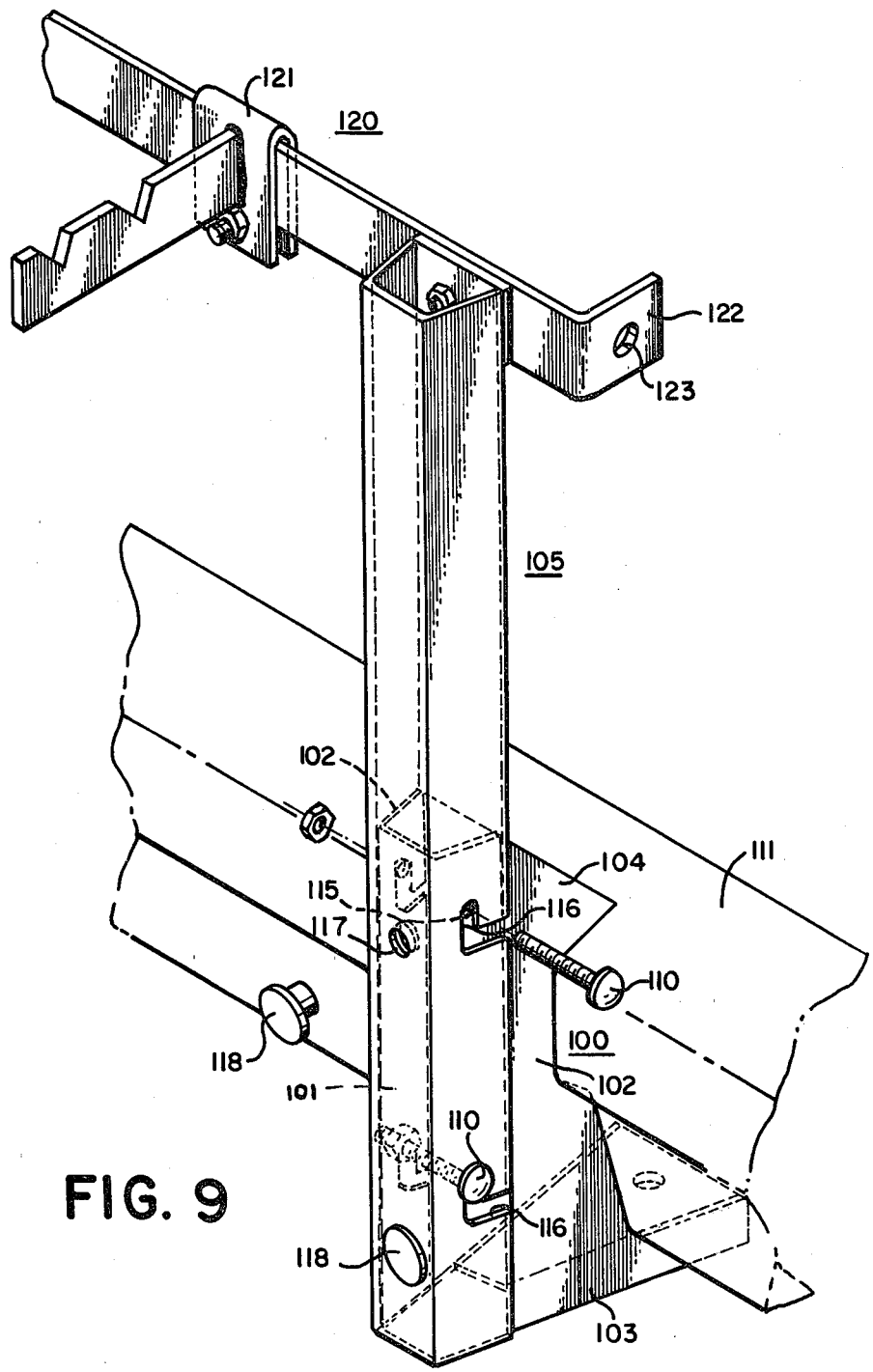
FIG. 9 is a view in perspective of another embodiment of my invention.

Referring now more particularly to FIG. 9, another embodiment of my invention is illustrated wherein a bumper guard 100 of conventional type is shown in place on a bumper 111 of an automotive vehicle (not shown). The bumper guard 100 includes a front portion 101, side portions 102, bottom portion 103, and a top portion 104.

A vertically extending member 105 is shown of U shape to fit over the front and side portion 101 and 102 and is detachably secured thereto by bolts 110 in holes 115 in bumper guard 100 and in holes 116 in member 105.

The member 105 can be provided with openings 117 for plugs 118 which protects the member 105 from contact damage.

The member 105 can be provided with a bar 120 which extends to another member 105 (not shown) also fastened to bumper 111. The bar 120 can be provided with clamps 121 similar to clamps 46 for carrying a bicycle (not shown) as desired. In addition, the bar 120 can be provided with lugs 122 with openings 123 as described for lugs 49.

The mode of use will be apparent from the foregoing. A bicycle (not shown) can be supported on the structure as shown in FIGS. 3, 5 and 9. The structure of FIG. 2, as well as that of 1, 3, 5 and 9, is adapted for the support and attachment of other articles by attachment of a rack 55 as desired.

I claim:

1. Bumper guards for mounting to the bumper of a vehicle,
    said bumper guards each having opposite side walls and front and rear walls forming an integral socket therebetween,
    vertically slidable members engaged in said sockets,
    said side walls each having at least one horizontally extending opening,
    a horizontal bar connecting said vertically slidable members,
    said members having a plurality of vertically spaced, horizontally aligned openings,
    members for horizontal insertion through said opening in said side walls of said bumper guards, and said openings in said members for adjusting the heights of said vertically slidable members,
    said bumper guards each having a lower connecting plate for restricting rotational movement of said guards and said bumper, and
    means for securing said connecting plate to said vehicle.
2. The structure as defined in claim 1 in which said bumper guard are made of metallic plates.
3. The structure as defined in claim 1 in which said bumper guards are made of synthetic plastic material.
4. The structure as defined in claim 1 in which said bar has clamps adjustable thereon with forwardly extending arms for supporting a bicycle.
5. The structure as defined in claim 1 in which said bar has a rack carried thereon.
6. The structure as defined in claim 1 in which said bumper guards are provided with a closure for said sockets.
7. Bumper guards as defined in claim 1 in which said bumper guards are formed of molded synthetic plastic with a stiffening insert therein.

* * * * *